US008941655B2

(12) United States Patent
Nordlund et al.

(10) Patent No.: US 8,941,655 B2
(45) Date of Patent: Jan. 27, 2015

(54) MEMORY COPY ENGINE FOR GRAPHICS PROCESSING

(75) Inventors: Petri Olavi Nordlund, Lieto (FI); Jukka-Pekka Arvo, Raisio (FI); Robert J. Simpson, Espoo (FI)

(73) Assignee: QUALCOMM Incorporated, San Diego, CA (US)

( * ) Notice: Subject to any disclaimer, the term of this patent is extended or adjusted under 35 U.S.C. 154(b) by 703 days.

(21) Appl. No.: 13/227,363

(22) Filed: Sep. 7, 2011

(65) Prior Publication Data

US 2013/0057562 A1 Mar. 7, 2013

(51) Int. Cl.
*G06T 15/50* (2011.01)
*G06F 13/00* (2006.01)
*G06F 12/08* (2006.01)
*G06F 15/167* (2006.01)
*G06T 1/60* (2006.01)

(52) U.S. Cl.
CPC .......... *G06F 12/0802* (2013.01); *G06F 15/167* (2013.01); *G06T 1/60* (2013.01)
USPC ............................ 345/426; 345/537; 345/538

(58) Field of Classification Search
CPC ............. G06T 1/20; G06T 1/60; G06T 15/80; G09G 5/363
USPC ......... 345/426, 519, 530, 531, 536, 537, 538, 345/555
See application file for complete search history.

(56) References Cited

U.S. PATENT DOCUMENTS

| 7,053,901 | B2 | 5/2006 | Huang et al. |
| 7,068,272 | B1 * | 6/2006 | Voorhies et al. ............... 345/422 |
| 7,821,520 | B1 | 10/2010 | Bastos et al. |
| 8,427,496 | B1 * | 4/2013 | Tamasi et al. ................. 345/544 |
| 2007/0273699 | A1 | 11/2007 | Sasaki et al. |
| 2009/0051687 | A1 | 2/2009 | Kato et al. |
| 2010/0053180 | A1 | 3/2010 | Ostiguy et al. |
| 2010/0315421 | A1 * | 12/2010 | Ford et al. ...................... 345/426 |
| 2010/0332792 | A1 * | 12/2010 | Clifton .............................. 712/4 |
| 2011/0023040 | A1 | 1/2011 | Hendry et al. |
| 2011/0057942 | A1 | 3/2011 | Mantor et al. |
| 2011/0210976 | A1 | 9/2011 | Diard |

OTHER PUBLICATIONS

Ryoo et al., "Optimization Principles and Application Performance Evaluation of a Multithreaded GPU Using CUDA," Proceedings of the 13th ACM SIGPLAN Symposium on Principles and practice of parallel programming [Online] 2008, pp. 73-82.
International Preliminary Report on Patentability from international application No. PCT/US2012/050613 dated Apr. 16, 2014 6 pp.
International Search Report and Written Opinion—PCT/US2012/050613—ISA/EPO—Nov. 2, 2012, 12 pp.
Response to Written Opinion dated Nov. 2, 2012, from International PCT application No. PCT/US2012/050613, filed Jul. 3, 2013, 19 pp.

(Continued)

*Primary Examiner* — Joni Richer
(74) *Attorney, Agent, or Firm* — Shumaker & Sieffert, P.A.

(57) ABSTRACT

The example techniques described in this disclosure may be directed to interaction between a graphics processing unit (GPU) and a system memory. For example, the GPU may include a memory copy engine that handles tasks related to accessing data that is stored or is to be stored in the system memory. In addition, in some examples, the memory copy engine may perform additional tasks such as modification tasks to increase the performance of the GPU.

27 Claims, 3 Drawing Sheets

(56) References Cited

OTHER PUBLICATIONS

Second Written Opinion from International Application No. PCT/US2012/050613 dated Jan. 9, 2014, 7 pp.

Reply to Second Written Opinion dated Jan. 9, 2014 from International Patent application No. PCT/US2012/050613 filed Mar. 7, 2014, 23 pp.

* cited by examiner

MEMORY COPY ENGINE FOR GRAPHICS PROCESSING

TECHNICAL FIELD

This disclosure relates to graphics processing units (GPUs), and more particularly, to interaction between a GPU and memory.

BACKGROUND

A device that generates graphics content generally includes a graphics processing unit (GPU). The GPU may process graphics data to generate pixel values for the pixels on a display. Part of the processing of graphics data may require the GPU to access its local memory or system memory. For example, at least a portion of the graphics data may be stored in system memory, and the GPU may retrieve the graphics data from system memory.

SUMMARY

In general, this disclosure describes techniques for accessing graphics data stored in memory. In some examples, the techniques may include performing data modification tasks, independently from the execution of one or more programs on a graphics processing unit (GPU). For instance, the techniques of this disclosure may allow the GPU to separate tasks related to memory management and data modification from tasks related to data processing, and allow for independent execution of these tasks. As one example, the techniques described in this disclosure may allow the GPU to retrieve data from memory or store data in memory, and in parallel with performing such functions, execute instructions of one or more programs. As another example, the techniques described in this disclosure may allow the GPU to convert data into a more suitable form, which the executed instructions utilize, independently from the execution of the instructions.

In one example, this disclosure describes an apparatus that includes a system memory that is accessible via a system bus, and a graphics processing unit (GPU). The GPU includes a local memory, a memory copy engine, and a shader processor. The memory copy engine is operable to retrieve first data from the system memory via the system bus and store the first data into the local memory, and retrieve second data from the local memory and store the second data into the system memory via the system bus. The shader processor is operable to retrieve the first data from the local memory, process the first data to generate the second data, and store the second data into the local memory.

In another example, this disclosure describes a method that includes retrieving, with a memory copy engine of a graphics processing unit (GPU), first data from system memory that is external to the GPU via a system bus, and storing, with the memory copy engine of the GPU, the first data into local memory of the GPU. The method further includes retrieving, with a shader processor of the GPU, the first data from the local memory, processing, with the shader processor of the GPU, the first data to generate a second data, and storing, with the shader processor of the GPU, the second data into the local memory. The method also includes retrieving, with the memory copy engine of the GPU, the second data from the local memory, and storing, with the memory copy engine of the GPU, the second data into the system memory via the system bus.

In another example, this disclosure describes an apparatus that includes a system memory that is accessible via a system bus, and a graphics processing unit (GPU) that is external to the system memory. The GPU includes a local memory. In this example, the GPU also includes means for retrieving, with a memory copy engine of the GPU, first data from the system memory that is external to the GPU via the system bus, and means for storing, with the memory copy engine of the GPU, the first data into the local memory. The GPU also includes mean for retrieving, with a shader processor of the GPU, the first data from the local memory, means for processing, with the shader processor of the GPU, the first data to generate a second data, and means for storing, with the shader processor of the GPU, the second data into the local memory. The GPU further includes means for retrieving, with the memory copy engine of the GPU, the second data from the local memory, and means for storing, with the memory copy engine of the GPU, the second data into the system memory via the system bus.

In another example, this disclosure describes a non-transitory computer-readable storage medium. The non-transitory computer-readable storage medium includes instructions that cause a graphics processing unit (GPU) to retrieve, with a memory copy engine of the GPU, first data from system memory that is external to the GPU via a system bus, and store, with the memory copy engine of the GPU, the first data into local memory of the GPU. The instructions further cause the GPU to retrieve, with a shader processor of the GPU, the first data from the local memory, process, with the shader processor of the GPU, the first data to generate a second data, and store, with the shader processor of the GPU, the second data into the local memory. The instructions also cause the GPU to retrieve, with the memory copy engine of the GPU, the second data from the local memory, and store, with the memory copy engine of the GPU, the second data into the system memory via the system bus.

The details of one or more examples are set forth in the accompanying drawings and the description below. Other features, objects, and advantages will be apparent from the description and drawings, and from the claims.

DETAILED DESCRIPTION

Figure 1:
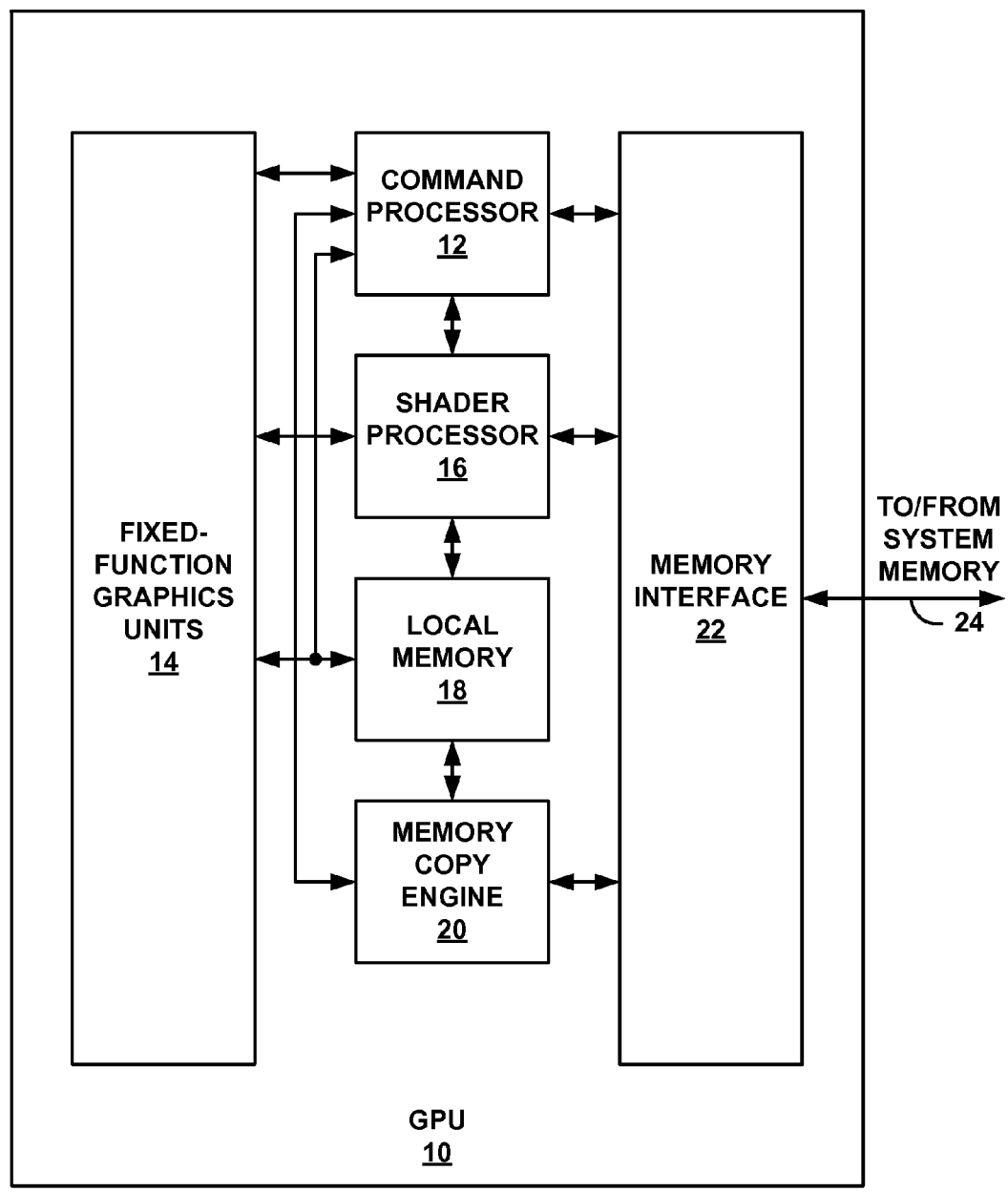
FIG. 1 is a block diagram illustrating an example of a graphics processing unit (GPU) that may be operable to implement one or more aspects of this disclosure.

In general, this disclosure relates to interaction between a graphics processing unit (GPU) and memory, such as system memory of a device that houses the GPU. The techniques of this disclosure are generally applicable to video devices such as media players, set-top boxes, wireless handsets such as mobile telephones, personal digital assistants (PDAs), desktop computers, laptop computers, gaming consoles, display devices, televisions, and the like.

Graphics processing systems generally include the GPU and the system memory. The GPU includes a shader processor and local memory, which may at times be shared with other processors external to the GPU or even part of the GPU.

The shader processor, sometimes referred to as a shader core, may be configured to execute various types of graphics related programs such as a geometry shader, a vertex shader, and a fragment shader. In some examples, the shader processor may be configured to execute programs in addition to programs related to graphics processing.

For example, a GPU may be configured for quickly and efficiently performing multiple tasks in parallel. Some applications may utilize the efficient parallel processing capabilities of the GPU for general purpose processing. In this sense, the GPU may function as a general purpose GPU (GPGPU). Programs for general purpose processing that execute on the shader processor of the GPU may be referred to as compute shaders. Graphics related programs, such as vertex shaders, pixel shaders, and fragment shaders, and general purpose processing programs, such as compute shaders, may be commonly referred to as shader programs to indicate that such programs are executed by the shader processor of the GPU. In other words, the term "shader programs" should not be considered limited to only programs that perform graphics related functions.

In some of the examples described in this disclosure, a GPU may also include a memory copy engine, in addition to the shader processor and the local memory. The memory copy engine may be implemented as hardware, software executing on hardware, or a combination thereof. The memory copy engine may be operable to handle memory related tasks of retrieving data from and storing data into a system memory. In this manner, instructions related to memory management of the system memory may be separated from instructions that are not related to memory management. This may allow the shader processor to execute instructions of the shader programs in parallel with the memory copy engine executing instructions for storage of data into or retrieval of data from the system memory. Parallel execution of instructions may refer to simultaneous execution of instructions by the shader processor and the memory copy engine, as well as, execution of instructions by the shader processor that overlap with the execution of instructions by the memory copy engine.

The tasks performed by the memory copy engine may be controlled by various mechanisms. For example, a command processor may schedule tasks of the memory copy engine and the shader processor. Alternatively, the shader processor may schedule the tasks of the memory copy engine. In some other examples, a device external to the GPU, such as a central processing unit (CPU), may schedule tasks of memory copy engine and the shader processor.

In some examples, the memory copy engine may execute instructions in addition to executing copy instructions. These additional instructions may be referred to as modification instructions. The modification instructions may modify the data into a more suitable form that the shader programs can utilize, or modify where the data is stored for ease of access, as two examples. In this manner, the shader processor is further freed to perform arithmetic operations, and other operations can be offloaded to the memory copy engine.

FIG. 1 is a block diagram illustrating an example of a graphics processing unit (GPU) 10 that may be operable to implement one or more aspects of this disclosure. Examples of GPU 10 include, but are not limited to, a digital signal processor (DSP), a general purpose microprocessor, an application specific integrated circuit (ASIC), a field programmable logic array (FPGA), or other equivalent integrated or discrete logic circuitry. As illustrated in FIG. 1, GPU 10 may include command processor 12, fixed-function graphics units 14, shader processor 16, local memory 18, memory copy engine 20, and memory interface 22. Memory interface 22 may be implemented as hardware components, software executing on hardware, firmware executing on hardware, or any combination thereof. GPU 10 may include additional units or modules that are not illustrated in FIG. 1 for purposes of clarity.

GPU 10 may be operable to implement various types of graphics pipelines. For example, GPU 10 may implement a graphics pipeline similar to that described in the OpenGL ES 2.0 specification, which was released on Apr. 24, 2008 by the Khronos Group, and is publicly available. As another example, aspects of this disclosure may be implemented in Microsoft® DirectX (DX) 10 and 11 application programming interfaces (APIs) that define a graphics pipeline. The graphics pipeline may be implemented as software executing on GPU 10, firmware executing on GPU 10, one or more hardware units, such as fixed-function graphics units 14, formed on GPU 10, or a combination thereof. GPU 10 may implement other types of graphics pipelines as well, and aspects of this disclosure should not be considered limited to the graphics pipeline of the OpenGL ES 2.0 specification, or the DX 10 and 11 APIs. Furthermore, there may be other types of graphics algorithms that may be implemented by GPU 10. For example, GPU 10 may implement ray-tracing instead of or in addition to the Open GL ES 2.0 and DX 10 and 11 APIs.

In addition to implementing graphics pipelines, GPU 10 may be operable to implement non-graphics related functions. For example, GPU 10 may be configured to support massive parallel processing functionality, which is suitable for graphics related functions that require quick and efficient processing of multiple tasks in parallel for generating pixel values for relatively large number of pixels of a display. For some non-graphics related applications, it may be considered desirable to exploit this quick and efficient parallel processing of GPU 10. In this sense, GPU 10 may be considered as a general purpose GPU (GPGPU) that is operable to perform both graphics and non-graphics related functions. As described in more detail, these graphics and non-graphics related functions may be defined by programs executing on GPU 10.

Command processor 12 may be the controller of GPU 10. For instance, command processor 12 may schedule the tasks that are to be performed by shader processor 16 and memory copy engine 20. As one example, shader processor 16 may perform operations, such as arithmetic operations, on blocks of data stored in system memory (not shown). In this example, command processor 12 may instruct memory copy engine 20 to retrieve a first block of data from system memory, and store the first block of data in local memory 18. Command processor 12 may instruct shader processor 16 to retrieve the first block of data from local memory 18, and perform functions on the first block of data. In some examples, while shader processor 16 is performing operations on the first block of data, command processor 12 may instruct memory copy engine 20 to retrieve a second block of data from system memory, in parallel with shader processor 16 performing operations on the first block of data.

For example, command processor 12 may be considered as pipelining the tasks performed by memory copy engine 20 and shader processor 16. For instance, command processor 12 may instruct memory copy engine 20 to perform a next copy instruction (e.g., retrieve data from or store data to the system memory), before memory copy engine 20 has completed performing the current copy instruction. In this example, after memory copy engine 20 completes the current copy instruction, memory copy engine 20 is ready to immediately perform the next copy instruction.

In some examples, memory copy engine 20 may provide an indication to shader processor 16 upon completion of a memory copying task. For instance, memory copy engine 20 may pre-store a next block of data that is to be used by shader processor 16 while shader processor 16 is performing tasks on a current block of data. In this example, memory copy engine 20 may indicate to shader processor 16 that the next block of data is already stored in local memory 18, and shader processor 16 may retrieve the next block of data from local memory 18 for processing.

In this manner, memory copy engine 20 may synchronize its operations with those of shader processor 16. For example, because memory copy engine 20 provides an indication to shader processor 16 when the data is available for processing, shader processor 16 may not attempt to retrieve and process data before the data is available for retrieval. This may potentially cause shader processor 16 to remain idle while shader processor 16 waits for the indication from memory copy engine 20. However, this idle time may be less than the amount of time it would take shader processor 16 to handle all memory related tasks because memory copy engine 20 executes its copy instructions while shader processor 16 executes its arithmetic operations.

In alternate examples, command processor 12 may monitor when memory copy engine 20 completed its tasks, and provide the indication that memory copy engine 20 completed its tasks to shader processor 16. In other words, command processor 12 may maintain the proper synchronization between the functions that are performed by shader processor 16 and the functions that are performed by memory copy engine 20.

In some alternate examples, shader processor 16 may perform the functions of command processor 12, and command processor 12 may not be necessary in these examples. In some other alternate examples, GPU 10 may receive scheduling information from an external device such as a central processing unit (CPU). In these examples, command processor 12 may not be necessary. However, even in either of these alternate examples, GPU 10 may still include command processor 12 for performing other functions. Also, in either of these alternate examples, memory copy engine 20 may provide an indication to shader processor 16 when it completes its tasks to synchronize the instructions executed by shader processor 16 and the instructions executed by memory copy engine 20.

Fixed-function graphics units 14 may be hardware units that may be hardwired to perform specific tasks. For example, fixed-function graphics units 12 may include one or more of a primitive assembly unit and a rasterization unit, although fixed-function graphics units 14 may include additional units. The primitive assembly unit of fixed-function graphics units 14 may assemble primitives, such as triangles or other types of polygons, based on vertex coordinates received from shader processor 16. The rasterization unit of fixed-function graphics units 14 may determine line equations for the assembled polygons, and determine which pixels reside within the assembled polygons based on the determined line equations. Such functionality of fixed-function graphics units 14 may not require operational flexibility, and may therefore be hardwired to perform particular functions.

Whereas fixed-function graphics units 14 may not provide operational flexibility, shader processor 16 may provide extensive operational flexibility. For example, shader processor 16, which also may be referred to as a shader core, is operable to execute programs such as both graphics and non-graphics related programs. The programs executed by shader processor 16 define the functions which are performed by shader processor 16.

For example, shader processor 16 is operable to execute graphics-related programs such as geometry shaders, vertex shaders, and fragment shaders. Geometry shaders receive graphics data of a single polygon, and may divide the single polygon into multiple polygons. Vertex shaders may receive the multiple polygons from the geometry shaders and perform functions such as coordinate transform and lighting on the vertices of the received polygons. Fragment shaders may determine pixel values of the pixels that are displayed on a display.

In some examples, shader processor 16 may also be operable to execute non-graphics related programs. For example, the massive parallel processing capabilities of GPU 10 may promote efficient execution of certain types of non-graphics related programs that perform multiple parallel functions. These types of non-graphics related programs may be referred to as compute shaders. The term "shader program" may refer generally to any program that executes on shader processor 16. For example, the term shader program refers to geometry shaders, vertex shaders, fragment shaders, and compute shaders.

The shader programs, executing on shader processor 16, perform operations such as arithmetic operations on data stored in system memory. For instance, shader processor 16 may include a plurality of arithmetic logic units (ALUs) that are programmable to perform desired arithmetic operations. The term "data" is used to refer to graphics related data such as pixel values (e.g., color values, opacity values, or other such attributes of pixels), as well as non-graphics related data (e.g., data that is used by a compute shader). The system memory may also store data generated by the shader programs such as the results of the arithmetic operations. System memory may be memory that is external to GPU 10, and requires system bus 24 for data access.

In accordance with aspects of this disclosure, memory copy engine 20 may handle memory related tasks that require interaction with the system memory. Memory copy engine 20 may be implemented as hardware, software executing on hardware, or a combination thereof. For instance, as a non-limiting example, memory copy engine 20 may be a program that performs very specific functions and is designed in accordance with the OpenGL or OpenCL standard, when implemented as software.

For purposes of illustration, memory copy engine 20 is described in the context of being a hardware unit. For instance, memory copy engine 20 may be formed as a DSP, an ASIC, a FPGA, or other equivalent integrated circuitry. In some examples, memory copy engine 20 may be formed as discrete logic circuitry or discrete analog circuitry. The examples above for a hardware unit are provided for illustration purposes and should not be considered as limiting.

As one example, memory copy engine 20 may execute copy instructions such as instructions to retrieve data from or store data into the system memory. For instance, memory copy engine 20 may execute instructions to retrieve data from the system memory and store the retrieved data into local memory 18 for use by the shader programs executing on shader processor 16. Memory copy engine 20 may also execute instructions to retrieve data stored in local memory 18 and store the retrieved data into the system memory.

As illustrated in FIG. 1, memory copy engine 20 may be coupled to memory interface 22. Memory copy engine 20 may retrieve data from or store data into the system memory via memory interface 22. In this sense, memory interface 22 may function as an intermediary between the components of GPU 10 and the system memory. For example, memory interface 22 may include components that allow memory interface 22 to output data via system bus 24, and receive data via system bus 24.

In example techniques described in this disclosure, shader processor 16 may be able to execute instructions in parallel with memory copy engine 20 executing instructions for storage of data to or retrieval of data from the system memory. For example, shader processor 16 may execute instructions while memory copy engine 20 is executing instructions for storage of data to or retrieval of data from the system memory. The parallel execution of shader processor 16 and memory copy engine 20 may refer to simultaneous execution or overlapping execution of instructions by shader processor 16 and memory copy engine 20.

It should be understood that the instructions executed by shader processor 16 and memory copy engine 20, either in parallel or otherwise, need not be the same instructions. In general, memory copy engine 20 may execute instructions related to memory access, which shader processor 16 may not execute. Also, although the techniques described in this disclosure allow memory copy engine 20 and shader processor 16 to execute instructions at the same time, aspects of this disclosure are not so limited. For instance, memory copy engine 20 and shader processor 16 need not execute instructions at the same time in every example. Rather, memory copy engine 20 and shader processor 16 are capable of executing instructions at the same time.

In some examples, because memory copy engine 20 may execute instructions for storage of data to or retrieval of data from the system memory, shader processor 16 may be configured to not retrieve data from the system memory or store data into the system memory. In other words, accessing the system memory may be completely offloaded from shader processor 16, and such accessing may only be performed by memory copy engine 20, in this example. In this manner, shader processor 16 is free to execute the shader program or programs while memory copy engine 20 retrieves and stores data. This frees up shader processor 16 from not needing to execute instructions for data retrieval or storage and is free to execute instructions of the shader program or programs simultaneously with the retrieval and storage of data functions performed by memory copy engine 20. In alternate examples, it may still be possible for shader processor 16 to access the system memory.

In examples of this disclosure, shader processor 16 may still execute instructions for storing data generated by the shader programs into local memory 18 and instructions for retrieving data from local memory 18. For example, memory copy engine 20 may execute copy instructions related to data storage and retrieval, and while memory copy engine 20 is executing such copy instructions, shader processor 16 may continue to execute data processing instructions, at the same time (e.g., simultaneously), such as data processing instructions of the shader programs. One example of the data processing instructions may be arithmetic instructions because such instructions are generally for performing arithmetic operations on the data.

Offloading instructions related to accessing the system memory to memory copy engine 20 may further promote the processing efficiencies of GPU 10. For example, conventional techniques relied on shader processor 16 to handle all instructions related to accessing memory, e.g., both local memory 18 and the system memory. For instance, in these conventional techniques, shader processor 16 would be coupled to memory interface 22 via a texture fetch pipeline. In accordance with these conventional techniques, shader processor 16 would access system memory via the texture fetch pipeline and memory interface 22.

However, while instructions of the shader programs for accessing local memory 18 may execute asynchronously with other instructions of the shader programs, instructions of the shader programs for accessing the system memory may not execute asynchronously. Rather, instructions for accessing the system memory, on shader processor 16, may execute synchronously with other instructions of the shader programs. For instructions for accessing the system memory, in the conventional techniques, shader processor 16 may remain idle, and unable to execute other instructions, while shader processor 16 waits for data to be stored on to the system memory or retrieved from the system memory.

With memory copy engine 20, the techniques described in this disclosure may allow shader processor 16 to execute data processing instructions for the data in parallel with, e.g., substantially simultaneously with, the execution of the memory copy instructions by memory copy engine 20, e.g., data transfer operations between the system memory and GPU 10, and with increased performance as shader processor 16 no longer needs to execute the memory copy instructions. The slots for the instructions of the shader programs, previously used for memory copy instructions, may be freed for instructions to be executed by shader processor 16 for performing actual arithmetic operations, e.g., executing data processing instructions. With memory copy engine 20, shader processor 16 is not required to remain idle and unable to execute other instructions, while data is copied into the system memory or retrieved from the system memory. Instead, memory copy engine 20 handles these tasks, allowing shader processor 16 to continue to execute data processing instructions.

As illustrated, memory copy engine 20 is a separate, independent processing unit from shader processor 16, although it may be possible for shader processor 16 to control memory copy engine 20. For instance, while memory copy engine 20 and shader processor 16 may be formed within GPU 10, memory copy engine 20 and shader processor 16 may not be formed within one another. In other words, in some examples, the functions performed by memory copy engine 20 are functions that shader processor 16 does not need to perform. For instance, shader processor 16 may still be able to access the system memory for storage and retrieval; however, with memory copy engine 20 performing such tasks, shader processor 16 may be freed from performing such tasks. The arithmetic operations that are to be performed by the shader programs are localized to within shader processor 16. The operations related to accessing the system memory are localized to within memory copy engine 20. In some examples, memory copy engine 20 may perform only functions related to accessing the system memory; however, aspects of this disclosure are not so limited as described below.

In general, memory copy engine 20, shader processor 16, and local memory 18 are separate from one another and on a chip of GPU 10. For example, where GPU 10 is its own integrated circuit (e.g., a chip), memory copy engine 20, shader processor 16, and local memory 18 are distinct components of the GPU 10 chip (e.g., separate from one another and on the chip of GPU 10). In some other examples, memory copy engine 20 and shader processor 16 may be separate from one another, and part of GPU 10; however, local memory 18 may be shared with other devices.

There may be various ways to cause memory copy engine 20 to perform the example functions described above. In general, the example techniques to cause memory copy engine 20 to perform the example functions may allow memory copy engine 20 to pre-store data into local memory 18 so that it is available for processing by the shader programs executing on shader processor 16 when such shader programs require the data. For instance, memory copy engine 20 may be capable of sequentially storing vertex data in local memory 18 before shader processor 16 utilizes the vertex data. Also, the example techniques to cause memory copy engine 20 to perform the example functions may allow memory copy engine 20 to store data from local memory 18 into the system memory while shader processor 16 is executing other instructions.

As one example, command processor 12 may schedule memory copy instructions that are executed by memory copy engine 20 simultaneously with data processing instructions that are executed by shader processor 16. For example, command processor 12 may cause memory copy engine 20 to retrieve a first block of source data from the system memory and store the first block of source data in local memory 18. A block of data may be a predetermined amount of data, e.g., attribute values for 10 pixels as one example for illustration purposes only. Source data may be referred to as data retrieved from the system memory.

Command processor 12 may then cause shader processor 16 to retrieve the first block of source data from local memory 18 and process the first block of source data to generate a first block of results data. The first block of results data may be a block of data generated by shader processor 16 after shader processor 16 processes a block of source data.

While shader processor 16 is processing the first block of source data (e.g., at the same time), command processor 12 may cause memory copy engine 20 to execute instructions to retrieve a second block of source data from the system memory, and store the second block of source data into local memory 18. After shader processor 16 completes processing the first block of source data, shader processor 16 may then store results of the processing of the first block of source data, e.g., a first block of results data, into local memory 18, and immediately begin processing the second block of source data from local memory 18. In this manner, if local memory 18 includes sufficient storage capability to store data retrieved from the system memory, e.g., source data, and store processed data processed by shader processor 16, e.g., results data, at the same time, memory copy engine 20 may execute copy instructions at the same time that shader processor 16 executes data processing instructions. In this manner, command processor 12 may queue the memory copy operations that are performed by memory copy engine 20.

As another example, shader processor 16 may perform some or all of the example functions of command processor 12 described in the previous example. In these examples, command processor 12 may not be necessary because shader processor 16 may perform such functions of command processor 12. However, GPU 10 may still include command processor 12, if command processor 12 is needed for performing other tasks.

For example, shader processor 16 may issue a command to memory copy engine 20 that instructs memory copy engine 20 to execute instructions to retrieve a next block of source data, while shader processor 16 is processing a current block of source data. Then, after completion of the processing of the current block of source data, shader processor 16 may store the results data (e.g., the results of the processing of the current block of source data) in local memory 18, and being processing the source data for the next block, which memory copy engine 20 pre-stored in local memory 18. Shader processor 16 may also instruct memory copy engine 20 to retrieve the results data from local memory 18 and store the results data into the system memory.

As yet another example, command processor 12 may operate as a command sequencer. In this example, command processor 12 may receive instructions that are to be performed by GPU 10 from another device, such as a central processing unit (CPU). Command processor 12 may divide the received instructions into instructions that are to be performed by shader processor 16 and instructions that are to be performed by memory copy engine 20. For example, command processor 12 may divide the instructions into arithmetic operations that are to be performed by shader processor 16 and into memory interaction operations that are to be performed by memory copy engine 20. Command processor 12 may then forward the instructions for performing arithmetic operations to shader processor 16 and forward the instructions for performing memory interaction operations to memory copy engine 20 as appropriate.

For example, command processor 12 may forward instructions to shader processor 16 that cause shader processor 16 to retrieve a block of data from local memory 18 and process the data. Command processor 12 may forward instructions to memory copy engine 20 to retrieve a block of source data from the system memory, and shader processor 16 and memory copy engine 20 may execute their respective instructions at the same time. In this manner, the source data that shader processor 16 will process next is pre-stored in local memory 18. Also, command processor 12 may forward instructions to memory copy engine 20 to retrieve the data resulting from the operations performed by shader processor 16 from local memory 18, and store such data into the system memory.

As a further example, another device, such as the CPU, may transmit instructions directly to each one of shader processor 16 and memory copy engine 20. For example, the CPU may transmit all instructions related to interactions with the system memory to memory copy engine 20, and all instructions related to arithmetic operations to shader processor 16.

In these examples, command processor 12 may not be necessary because the CPU may provide instructions directly to shader processor 16 and memory copy engine 20. However, GPU 10 may still include command processor 12, if command processor 12 is needed for performing other tasks.

In the preceding examples (e.g., where GPU 10 includes command processor 12 or where GPU 10 does not include command processor 12), memory copy engine 20 may pre-store data that will be subsequently used by shader processor 16. In some examples, memory copy engine 20 may provide an indication to shader processor 16 that the next data that shader processor 16 should use is already stored in local memory 18 to synchronize the instructions of memory copy engine 20 and shader processor 16. Shader processor 16 may then retrieve the pre-stored data from local memory 18, process the data, and generate results data that is the result of the processing of the data. Shader processor 16 may then store the results data in local memory 18. In some examples, for instance where the results data is no longer needed by shader processor 16, memory copy engine 20 may retrieve the results data from local memory 18 and store the results data in the system memory. Even in instances where the results data is needed for subsequent processing, it may be possible for memory copy engine 20 to retrieve the results data from local memory 18 and store the results data in system memory to free memory space on local memory 18.

The example techniques described in this disclosure may be beneficial in various types of systems. As a few examples, the techniques described in this disclosure may be applicable for optimization of binning-based rendering, image processing, border area copying (e.g., copying of parts of neighboring blocks or tiles), and queues-based communication. In general, the example techniques described in this disclosure may be beneficial to any shader processor application that requires transfer of data between GPU 10 and the system memory.

As an example, such functionality may be beneficial for executing a shader program that performs filtering operations on a generated image, although aspects of this disclosure should not be considered so limiting. For instance, the shader program that performs filtering operations may perform such filtering operations on a block-by-block or tile-by-tile basis on the generated image. In this example, memory copy engine 20 may pre-store the next block or tile, while shader processor 16 is performing tasks on the current block or tile. It should be understood that aspects of this disclosure may be beneficial for situations in addition to situations where shader processor 16 executes a shader program that performs filtering operations. The ability of memory copy engine 20 to pre-store data may be beneficial across a wide variety of different types of shader programs.

As another example, when performing filtering operations, the functionality of memory copy engine 20 may allow for loading, in addition to the next block or tile of the source image, parts of its neighboring blocks or tiles, as required by the filter. In some examples, when shader programs need to store data outside the current block or tile into local memory 18, the operation may result in redundancy or increased complexity. Memory copy engine 20 may not be restricted in this way. For example, memory copy engine 20 may be able to retrieve a larger portion of data without redundancy or increased complexity.

Moreover, in some examples, these shader programs may be required to load data with a rectangular footprint (e.g., data that must be stored in storage locations of local memory that form a rectangular area). Memory copy engine 20 may not be required to load data with such restrictions. In some examples, memory copy engine 20 may be configured such that it may be able to load data with non-rectangular footprints. In this manner, memory copy engine 20 may reduce the redundancy and complexity.

Although the previous examples are described with memory copy engine 20 performing tasks related to accessing system memory, aspects of this disclosure are not so limited. In some examples, memory copy engine 20, instead of or in addition to performing tasks related to accessing system memory, may perform modification tasks. Modification tasks may refer to modifying data stored in the system or data that is to be stored in system memory to data into a more usable form. Modification tasks may also refer to modifying locations where the data is stored.

As one example of modification tasks where memory copy engine 20 modifies locations where the data is stored, memory copy engine 20 may gather and compact data. For instance, data that is shared between different shader programs may be sparsely populated. Sparsely populated data may refer to a relatively small amount of data that is stored across a relatively large storage portion. In these instances, memory copy engine 20 may compact the data so that it is not stored across a relatively large portion of the system memory or local memory 18. Instead, the sparsely populated data may be rewritten to a smaller portion of memory. This compaction of data may allow memory copy engine 20 to access the data more quickly. Also, because shader processor 16 is unaware of such data compaction, there may be no need to modify the instructions of the shader programs that utilize the data for arithmetic operations.

As a few examples where memory copy engine 20 modifies data stored in system memory or data that is to be stored in system memory, memory copy engine 20 may convert a linear block of data into a tiled block of data, or vice-versa for storage into local memory 18 or storage into the system memory. Memory copy engine 20 may also shuffle data in the x, y direction of a matrix, convert red-green-blue (RGB) colors to luma and chrominance components (YUV) colors, or vice-versa, encode RGB or YUV format into another format, as well as any other modification useful for shader processor 16. For example, memory copy engine 20 may also execute modification instructions that convert the data stored in local memory 18 into another form that is useable by some other shader program. Memory copy engine 20 may also pack or unpack compressed data structures or image formats when retrieving data from system memory and storing the data into local memory 18, as well as pack or unpack compressed data structures or image formats when retrieving data from local memory 18 and storing the data into the system memory.

For instance, a compute shader may generate results data for a vertex shader. However, the data format of the results data may not be the correct format for the vertex shader. In this example, memory copy engine 20 may modify the format of the results data, from the compute shader, into a format suitable for the vertex shader. Memory copy engine 20 may also modify where the data is stored (e.g., copy data from one location within local memory 18 to another location within local memory 18). In terms of performance, this may be beneficial because memory copy engine 20 may place data in locations of local memory 18 that shader processor 16 can access efficiently by using fast access patterns that shader processor 16 has to local memory 18.

As more examples, memory copy engine 20 may also perform modification tasks such as conversion of linked lists to linear format, planar to padded YUV, or vice versa, encoded HDR (High Dynamic Range) or RGB formats to FP16 or FP32, addition or removal of padding, data alignment, compression or decompression of data, 2D wavelet transform, data structure parsing (such as list and tree structures), and like. Memory copy engine 20 may also provide multiple copies of the data. For example, when storing data into the system memory, memory copy engine 20 may store multiple copies of the data for protection of the data from corruption. These are various examples of the modification tasks that memory copy engine 20 can perform, provided for purposes of illustration, and aspects of this disclosure should not be considered limited to the examples above.

In this manner, some of the modification instructions that may have been executed by shader processor 16 may be offloaded to memory copy engine 20. This may allow shader processor 16 to only execute data processing instructions such as arithmetic operations, and memory copy engine 20 may perform any copying and modifying tasks.

Local memory 18 may be formed as cache, registers, or any form in which data can be stored. The components of GPU 10 may be able to retrieve data from or store data into local memory 18 more quickly and with less power consumption than retrieving data from or storing data into the system memory. For example, the components of GPU 10 may access local memory 18 without requiring extensive scheduling and without a separate bus. However, accessing the system memory may require access scheduling which may be time consuming. For example, GPU 10 may be able to access the system memory during available timeslots when there is no data transferring along system bus 24. Accessing system memory via system bus 24 may consume power.

Moreover, although local memory 18 is illustrated as being internal to GPU 10, aspects of this disclosure are not so limited. In some examples, GPU 10 may be part of a larger integrated circuit. This integrated circuit may include additional processing units such as a display processor, video processor, and the like. In these examples, local memory 18 may potentially be external to GPU 10, and may function as a local memory for the various processing units within the integrated circuit. In this sense, local memory 18 may be considered as a shared local memory. However, even in these examples, the components of GPU 10 may be able to access local memory 18 quicker and with less power consumption as compared to accessing the system memory via system bus 24. Moreover, in any of these examples, GPU 10 may still be viewed as comprising local memory 18 because local memory 18 functions as the local memory for GPU 10. For instance, even where local memory 18 is external to GPU 10, local memory 18 may still be considered to be functionally a part of GPU 10 because local memory 18 provides local memory storage and retrieval to the components of GPU 10.

Figure 2:
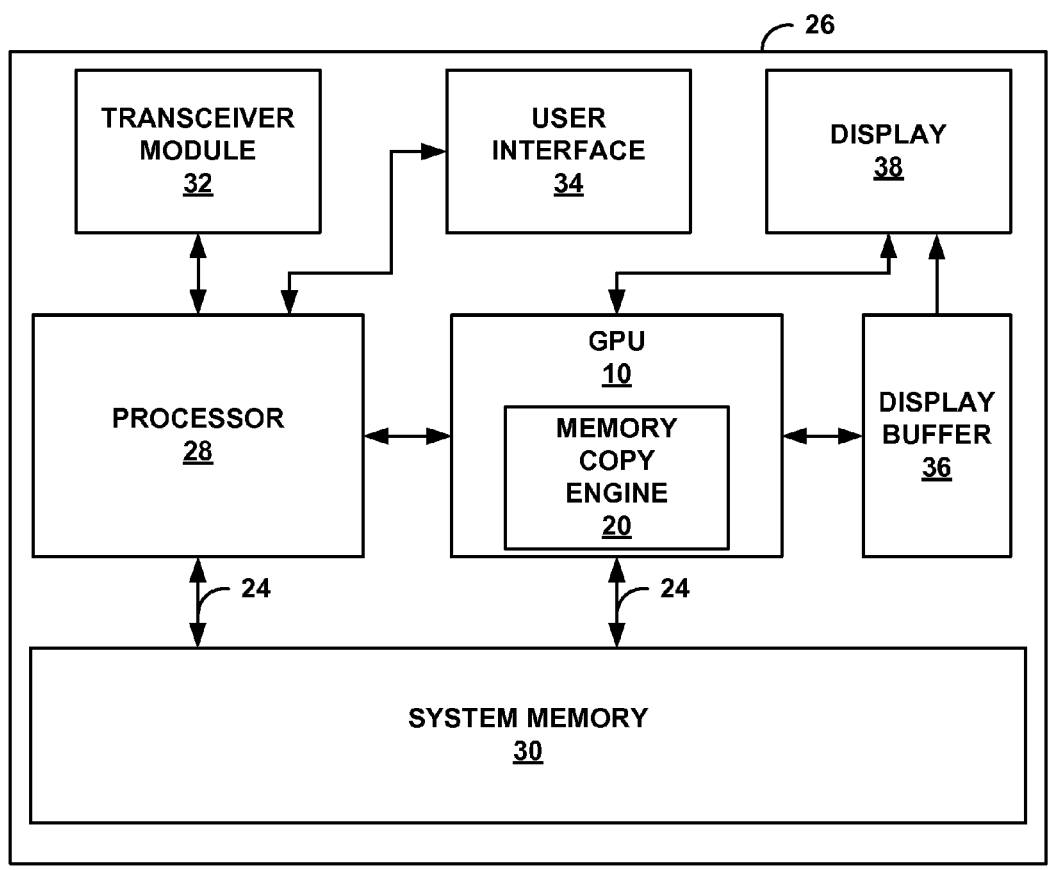
FIG. 2 is a block diagram illustrating an example of a computing device that may incorporate the GPU of FIG. 1 to implement one or more aspects of this disclosure.

FIG. 2 is a block diagram illustrating an example of a device 26 that may be operable to implement one or more aspects of this disclosure. Examples of device 26 include, but are not limited to, video devices such as media players, set-top boxes, wireless handsets such as mobile telephones, personal digital assistants (PDAs), desktop computers, laptop computers, gaming consoles, video conferencing units, tablet computing devices, and the like. Device 26 may include processor 28, graphics processing unit (GPU) 10, system memory 30, transceiver module 32, user interface 34, display buffer 36, and display 38.

GPU 10 of device 26, as illustrated in FIG. 2, may be identical or substantially similar to GPU 10 of FIG. 1. For example, GPU 10 includes memory copy engine 20, which is identical to or substantially similar to memory copy engine 20 of FIG. 1. For instance, memory copy engine 20 may perform tasks that require accessing system memory 30, as well as, in some examples, perform data formatting tasks. For purposes of brevity, the example functionality of GPU 10 and memory copy engine 20 is not discussed further in the example of FIG. 2.

Processor 28 may be the central processing unit (CPU) of device 26, and may perform the functions of the CPU described above in FIG. 1. Examples of processor 28 include, but are not limited to, a DSP, a general purpose microprocessor, an ASIC, a FPGA, or other equivalent integrated or discrete logic circuitry. Although processor 28 and GPU 10 are illustrated as separate units, aspects of this disclosure are not so limited. In some examples, processor 28 and GPU 10 may be formed in a common integrated circuit (IC). Processor 28 and GPU 10 may each include a single processor core or multiple processor cores.

Device 26 may include additional modules or units not shown in FIG. 2 for purposes of clarity. For example, device 26 may include a speaker and a microphone, neither of which are shown in FIG. 2, to effectuate telephonic communications in examples where device 26 is a mobile wireless telephone, or a speaker where device 26 is a media player. Furthermore, the various modules and units shown in device 26 may not be necessary in every example of device 26. For example, user interface 34 and display 38 may be external to device 26 in examples where device 26 is a desktop computer or other device that is equipped to interface with an external user interface or display.

System memory 30 may be the overall memory for device 26, but not the local memory for GPU 10 (e.g., local memory 18). For example, system memory 30 may store data produced by GPU 10, which may be referred to as results data because the results data may be the resulting from the tasks performed by shader processor 16 of GPU 10. Similarly, system memory 30 may store data that is to be used by GPU 10, which may be referred to as source data because the source data may be the data that shader processor 16 of GPU 10 uses to perform tasks. System memory 30 may also store pre-complied and/or compiled code for the shader programs that are executed by shader processor 16 of GPU 10. The various components of device 26, such as processor 28 and GPU 10, may access system memory 30 via system bus 24.

Examples of system memory 30 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to store desired program code in the form of instructions or data structures and that can be accessed by a computer, a processor, or a GPU. In some example system memory 30 may comprise one or more computer-readable storage media, such as a computer-readable storage device. For instance, in some example implementations, system memory 30 may include instructions that cause processor 28 and/or GPU 10 to perform the functions ascribed to processor 28 and GPU 10 in this disclosure.

System memory 30 may, in some examples, be considered as a non-transitory storage medium. The term "non-transitory" may indicate that the storage medium is not embodied in a carrier wave or a propagated signal. However, the term "non-transitory" should not be interpreted to mean that system memory 30 is non-movable. As one example, system memory 30 may be removed from device 26, and moved to another device. As another example, a storage device, substantially similar to system memory 32, may be inserted into device 26. In certain examples, a non-transitory storage medium may store data that can, over time, change (e.g., in RAM).

Examples of user interface 34 include, but are not limited to, a trackball, a mouse, a keyboard, and other types of input devices. User interface 34 may also be a touch screen and may be incorporated as a part of display 38. Transceiver module 32 may include circuitry to allow wireless or wired communication between device 26 and another device or a network. Transceiver module 32 may include modulators, demodulators, amplifiers and other such circuitry for wired or wireless communication.

GPU 10 may output the pixel values for an image that is to be displayed on display 38. In some examples, GPU 10 may output the pixel values directly to display 38. In some alternate examples, GPU 10 may output the pixel values of the image to display buffer 36. Display buffer 36 may temporarily store the pixel values of image until the entire image is rendered. Display buffer 36 may be considered as an image frame buffer. Display buffer 36 may then transmit the rendered image to be displayed on display 38. Display 38 may comprise a liquid crystal display (LCD), an organic light emitting diode display (OLED), a cathode ray tube (CRT) display, a plasma display, or another type of display device.

Figure 3:
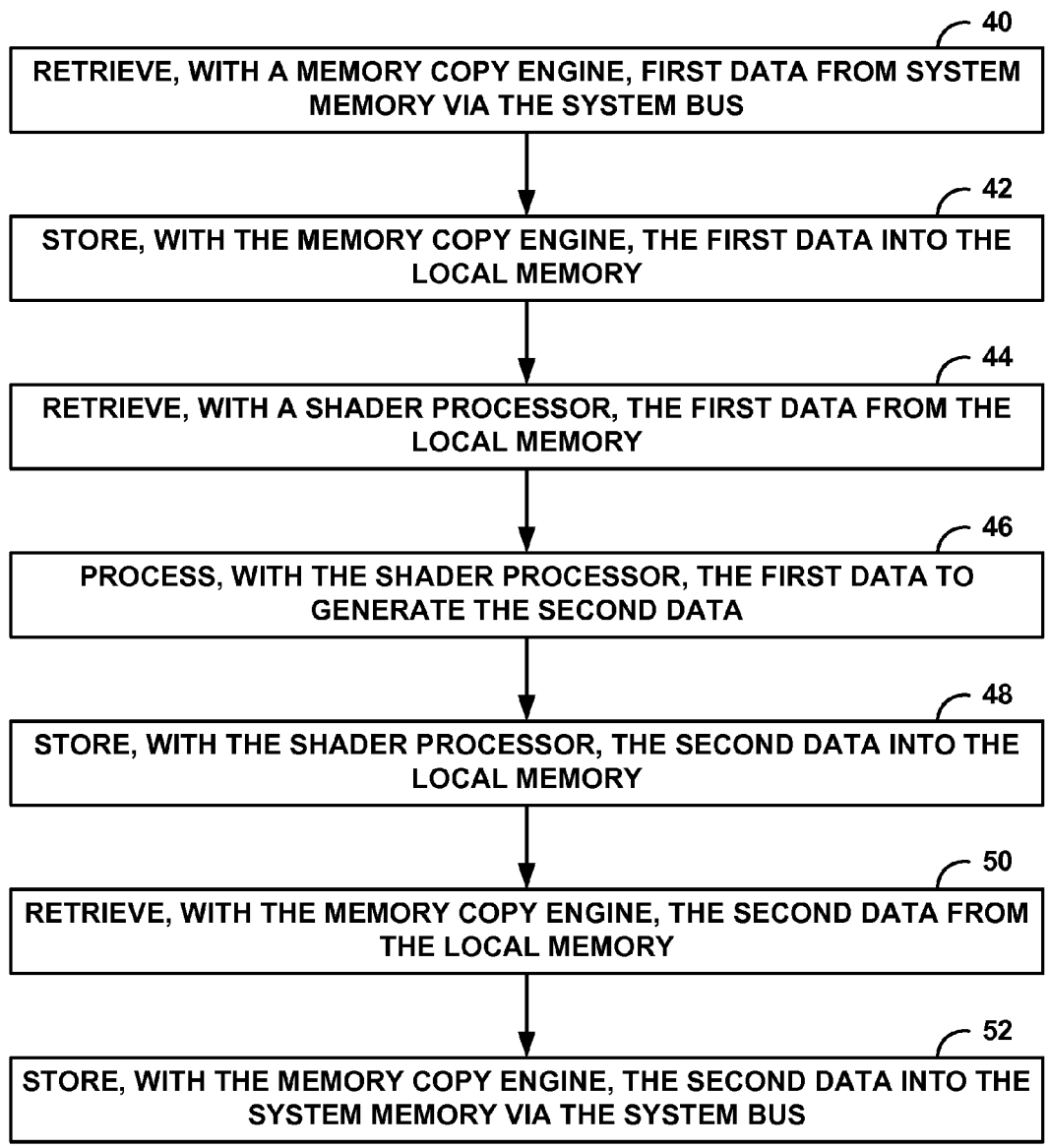
FIG. 3 is a flow chart illustrating an example operation of a GPU, as shown in FIG. 1, in accordance with one or more aspects of this disclosure.

FIG. 3 is a flow chart illustrating an example operation of GPU 10 in accordance with one or more aspects of this disclosure. For purposes of illustration only, reference is made to FIGS. 1 and 2.

Memory copy engine 20 of GPU 10 may retrieve first data from system memory 30 that is external to GPU 10 via system bus 24 (40). The first data may be source data, which refers to data stored in system memory 30. Memory copy engine 20 may store the first data into local memory 18 (42). Memory copy engine 20 may not need to access system bus 24 to store the first data into local memory 18. In some examples, memory copy engine 20 may modify the first data and store the modified first data into local memory.

Shader processor 16 of GPU 10 may retrieve the first data from local memory 18 (44), and may do so without accessing system bus 24. Shader processor 16 may process the first data to generate the second data (46). For example, shader processor 16 may execute instructions of shader programs that perform arithmetic operations on the first data to generate the second data. The second data may be viewed as results data to indicate that it is the data resulting from the operations of shader processor 16. Shader processor 16 may store the second data into local memory 18 (48). In some examples, shader processor 16 may not be capable of accessing system memory 30, and only memory copy engine 20 may be capable of accessing system memory 30, although aspects of this disclosure are not so limited. Also, in some examples, memory copy engine 20 may modify the second data and store the modified second data into the system memory.

Memory copy engine 20 may retrieve the second data from local memory 18 (50). Memory copy engine 20 may store the second data into system memory 30 via system bus 24 (52). In some examples, as described above, memory copy engine may also be operable to modify data. For example, memory copy engine 20 may modify the first data stored in local memory 18 into data useable by a shader program executing on shader processor 16. As another example, memory copy engine 20 may modify the second data stored in local memory 18 into data usable by a shader program executing on shader processor 16.

In one or more examples, the functions described may be implemented in hardware, software, firmware, or any combination thereof. If implemented in software, the functions may be stored as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus comprising:
    a system memory that is accessible via a system bus; and
    a graphics processing unit (GPU) comprising:
        a local memory;
        a memory copy engine configured to retrieve first data from the system memory via the system bus, perform one or more modification tasks on the first data, store the modified first data into the local memory, retrieve second data from the local memory, perform one or more modification tasks on the second data, and store the modified second data into the system memory via the system bus, wherein the modification tasks comprise at least one of gathering and compacting data, color conversion of data, compression of data, decompression of data, or conversion of data generated by one shader program into a data form usable by another shader program and store the second data into the system memory via the system bus; and
        a shader processor configured to retrieve the modified first data from the local memory, process the modified first data to generate the second data, and store the second data into the local memory,
    wherein the memory copy engine is further configured to indicate to the shader processor that the memory copy engine completed at least one of storing the modified first data into the local memory or storing the modified second data into the system memory.

2. The apparatus of claim 1, wherein the memory copy engine, the shader processor, and the local memory are separate from one another and on a chip of the GPU.

3. The apparatus of claim 1, wherein the modified first data comprises source data and the second data comprises results data resulting from the processing of the source data.

4. The apparatus of claim 1, wherein the memory copy engine is implemented as hardware or software executing on hardware, and wherein the hardware is separate from the shader processor and on a chip of the GPU.

5. The apparatus of claim 1, wherein the shader processor is at least one of not configured to retrieve the first data from the system memory, or not configured to store the second data into the system memory.

6. The apparatus of claim 1, wherein the shader processor is configured to execute instructions for arithmetic operations to process the modified first data to generate the second data.

7. The apparatus of claim 1, wherein the apparatus comprises at least one of a media player, a set-top box, a wireless handset, a personal digital assistant (PDA), a desktop computer, a laptop computer, a gaming console, a video conferencing unit, or a tablet computing device.

8. The apparatus of claim 1, wherein the memory copy engine is configured to retrieve a third data from or store the third data into the system memory simultaneously with the shader processor retrieving a fourth data from the local memory, processing the fourth data, or storing the fourth data into the local memory.

9. A method comprising:
retrieving, with a memory copy engine of a graphics processing unit (GPU), first data from system memory that is external to the GPU via a system bus;
performing, with the memory copy engine of the GPU, one or more modification tasks on the first data;
storing, with the memory copy engine of the GPU, the modified first data into local memory of the GPU;
retrieving, with a shader processor of the GPU, the modified first data from the local memory;
processing, with the shader processor of the GPU, the modified first data to generate a second data;
storing, with the shader processor of the GPU, the second data into the local memory;
retrieving, with the memory copy engine of the GPU, the second data from the local memory;
performing, with the memory copy engine of the GPU, one or more of the modification tasks on the second data;
storing, with the memory copy engine of the GPU, the modified second data into the system memory via the system bus; and
indicating, with the memory copy engine to the shader processor, that the memory copy engine completed at least one of storing the modified first data into the local memory or storing the modified second data into the system memory,
wherein the modification tasks comprise at least one of gathering and compacting data, color conversion of data, compression of data, decompression of data, or conversion of data generated by one shader program into a data form usable by another shader program.

10. The method of claim 9, wherein the memory copy engine, the shader processor, and the local memory are separate from one another and on a chip of the GPU.

11. The method of claim 9, wherein the modified first data comprises source data and the second data comprises results data resulting from the processing of the source data.

12. The method of claim 9, wherein the shader processor is at least one of not configured to retrieve the first data from the system memory, and not configured to store the second data into the system memory.

13. The method of claim 9, wherein processing the modified first data to generate the second data comprises executing instructions for arithmetic operations to process the modified first data to generate the second data.

14. The method of claim 9, further comprising:
retrieving, with the memory copy engine, a third data from or storing the third data into the system memory; and
simultaneously, with the shader processor, retrieving a fourth data from the local memory, processing the fourth data, or storing the fourth data into the local memory.

15. An apparatus comprising:
a system memory that is accessible via a system bus; and
a graphics processing unit (GPU) that is external to the system memory, the GPU comprising a local memory, a shader processor, and a memory copy engine,
the memory copy engine comprising:
means for retrieving first data from the system memory via the system bus;
means for performing one or more modification tasks on the first data;
means for storing the modified first data into the local memory;
the shader processor comprising:
mean for retrieving the modified first data from the local memory;
means for processing the modified first data to generate a second data;
means for storing the second data into the local memory;
the memory copy engine further comprising:
means for retrieving the second data from the local memory;
means for performing one or more of the modification tasks on the second data;
means for storing, the modified second data into the system memory via the system bus; and
means for indicating, to the shader processor, that the memory copy engine completed at least one of storing the modified first data into the local memory or storing the modified second data into the system memory,
wherein the modification tasks comprise at least one of gathering and compacting data, color conversion of data, compression of data, decompression of data, or conversion of data generated by one shader program into a data form usable by another shader program.

16. The apparatus of claim 15, wherein the memory copy engine, the shader processor, and the local memory are separate from one another and on a chip of the GPU.

17. The apparatus of claim 15, wherein the modified first data comprises source data and the second data comprises results data resulting from the processing of the source data.

18. The apparatus of claim 15, wherein the shader processor is at least one of not configured to retrieve the first data from the system memory, or not configured to store the second data into the system memory.

19. The apparatus of claim 15, wherein the means for processing the modified first data to generate the second data comprises means for executing instructions for arithmetic operations to process the modified first data to generate the second data.

20. The apparatus of claim 15, wherein the apparatus comprises at least one of a media player, a set-top box, a wireless handset, a personal digital assistant (PDA), a desktop computer, a laptop computer, a gaming console, a video conferencing unit, or a tablet computing device.

21. The apparatus of claim 15, wherein the memory copy engine further comprises:
means for retrieving a third data from or storing the third data into the system memory, and
wherein the shader processor further comprises:
means for simultaneously retrieving a fourth data from the local memory, processing the fourth data, or storing the fourth data into the local memory.

22. A non-transitory computer readable storage medium comprising instructions that cause a graphics processing unit (GPU) to:
retrieve, with a memory copy engine of the GPU, first data from system memory that is external to the GPU via a system bus;
perform, with the memory copy engine of the GPU, one or more modification tasks on the first data;
store, with the memory copy engine of the GPU, the modified first data into local memory of the GPU;
retrieve, with a shader processor of the GPU, the modified first data from the local memory;
process, with the shader processor of the GPU, the modified first data to generate a second data;

store, with the shader processor of the GPU, the second data into the local memory;
retrieve, with the memory copy engine of the GPU, the second data from the local memory;
perform, with the memory copy engine of the GPU, one or more of the modification tasks on the second data;
store, with the memory copy engine of the GPU, the modified second data into the system memory via the system bus; and
indicate, with the memory copy engine to the shader processor, that the memory copy engine completed at least one of storing the modified first data into the local memory or storing the modified second data into the system memory,
wherein the modification tasks comprise at least one of gathering and compacting data, color conversion of data, compression of data, decompression of data, or conversion of data generated by one shader program into a data form usable by another shader program.

23. The non-transitory computer readable storage medium of claim 22, wherein the memory copy engine, the shader processor, and the local memory are separate from one another and on a chip of the GPU.

24. The non-transitory computer readable storage medium of claim 22, wherein the modified first data comprises source data and the second data comprises results data resulting from the processing of the source data.

25. The non-transitory computer readable storage medium of claim 22, wherein the shader processor is at least one of not configured to retrieve the first data from the system memory, or not configured to store the second data into the system memory.

26. The non-transitory computer readable storage medium of claim 22, wherein the instructions that cause the GPU to process the modified first data to generate the second data comprise instructions that cause the GPU to execute instructions for arithmetic operations to process the modified first data to generate the second data.

27. The non-transitory computer readable storage medium of claim 22, further comprising instructions to:
retrieve, with the memory copy engine, a third data from or store the third data into the system memory; and
simultaneously, with the shader processor, retrieve a fourth data from the local memory, process the fourth data, or store the fourth data into the local memory.

* * * * *